Patented Feb. 3, 1942

2,271,940

UNITED STATES PATENT OFFICE 2,271,940

STABILIZED HYDROCARBON

William H. James and Everett W. Fuller, Woodbury, N. J., assignor to Socony-Vacuum Oil Company, Incorporated, New York, N. Y., a corporation of New York No Drawing. Application March 2, 1940,
Serial No. 321,922

2 Claims. (Cl. 252—51)

Refined petroleum oils generally tend to deteriorate in service and in storage, due to the effects of oxidation and allied causes to form acidic and/or sludge-like materials which are detrimental to the purposes for which the oils are intended. Acids attack metal surfaces in transformers, turbines, and engines, while sludges precipitate out, clogging passages and tubes to reduce the flow of oil to points where it is needed, and settle on cooling surfaces to reduce the heat transfer capabilities thereof.

This invention has for its object the provision of a novel class of inhibitive compounds possessed of rather uniform inhibitive capabilities over a rather wide field of petroleum derivatives of high boiling point, ranging from lubricating oils of low viscosity to waxes, and effective regardless of degree or kind of treatment to which the oil to be inhibited has been subjected.

This invention is based upon the discovery that products resulting from the condensation of nitro-aromatic compounds with other materials, as naphthylamines, and other organic amino compounds have valuable inhibitive properties.

This invention, from the inhibitive standpoint, is based upon the discovery that novel inhibitive capabilities are possessed, as described above, by products resulting from the condensation of nitro-aromatics, as for example, sym-tri-nitrobenzene, (1,3,5, trinitrobenzene), with naphthylamines, or other amino compounds. Such products for example, those prepared from naphthylamines, are cheap, easy to prepare, stable, and possess a breadth, consistency and extent of effectiveness quite different from the related naphthylamines, some members of which group are stabilizers of rather erratic capabilities.

The condensation products referred to may be produced from the indicated starting materials by the method of synthesis set forth by J. J. Sudburough, (J. Chem. Soc. 79, 522 (1901)) and subsequently, particularly (J. Chem. Soc. 83, 1334 (1903) and 97, 773 (1910)). The method generally is as follows:

A benzene solution of 1,3,5 trinitrobenzene was added to a benzene solution of the naphthylamine and after standing a short time at room temperature the condensation product separated. It was purified by recrystallization from alcohol. With most of the naphthylamines the reactants were used in equal molecular ratios but with N-phenyl alpha naphthylamine a better yield is obtained when two moles of trinitrobenzene are used to one mole of the naphthylamine. The products obtained were reddish crystals with definite melting points quite different from those of the original amines. For example, the following compounds have been prepared from 1,3,5 trinitrobenzene and the naphthylamine noted below:

| Naphthylamine used | M. P. of original amine °C. | M. P. of product |
|---|---|---|
| Alpha naphthylamine | 50 | 214 |
| Beta naphthylamine | 110 | 162 |
| N-n-butyl alpha naphthylamine | Liquid | 135 |
| N-phenyl alpha naphthylamine | 62 | 130 |
| N,N,diethyl alpha naphthylamine | Liquid | 95 |

Similar products may be obtained by condensing other trinitro aromatic compounds, such as trinitrotoluene, trinitrocresol, trinitroresorcinol and trinitroanisole, with naphthylamines or other amino compounds.

The products so produced are capable stabilizers for wide field of petroleum derivatives. They are effective in oils which have been highly refined by heavy treatments with sulphuric acid. They are effective in oils which have been moderately refined with acid. They are effective in solvent refined lubricating oils, and they are capable of preventing deterioration of wax by acid formation and similar oxidation reactions.

As with any product used for an inhibitor, oil solubility of the inhibitor is of importance. Only a few of these products have oil solubility so restricted as to hamper their usefulness, and apparently then only with a few oils.

The stabilizing effect of these materials in various petroleum oils is shown by the following examples:

A. *Oils highly refined by means of sulfuric acid.*—A highly refined oil, suitable for use in transformers had been prepared by treating a Coastal distillate with 40 lbs. of 98% sulfuric acid and 180 lbs. of 103% oleum per bbl., followed by neutralization, washing and clay percolation. It had a specific gravity of 0.871, a flash point of 310° F., and a Saybolt Universal viscosity of 69 secs., at 100° F. This type of oil tends to form acidic products on oxidation and it was tested by heating samples to 120° C. and bubbling oxygen through for 70 hrs. The acids thus formed were then determined by titrating with alcoholic potash. Results for the oil alone and with the addition of the stabilizers herein disclosed are given below in terms of N. N. value (mg. of KOH required to neutralize the acids in 1 gram of oil):

TABLE I

*Oils highly refined by means of sulfuric acid*

|  | Percent conc. | N. N. value |
|---|---|---|
| Oil alone | 0.00 | 25.0 |
| 1,3,5 trinitrobenzene and beta-naphthylamine | .05 | 7.0 |
| 1,3,5 trinitrobenzene and butyl-alpha-naphthylamine. | .05 | .23 |
| 1,3,5 trinitrobenzene and phenyl-alpha-naphthylamine | .05 | 0.0 |
| 2,4,6 trinitrotoluene and beta-naphthylamine | .05 | 3.8 |
| 2,4,6 trinitrotoluene and phenyl-alpha-naphthylamine. | .05 | .06 |
| 2,4,6 trinitro-m-cresol and phenyl-alpha-naphthylamine. | .05 | 0.0 |

It is noted that the products effectively stabilize this oil.

B. *Oils moderately refined by means of sulfuric acid.*—A mixed Mid-Continent and Coastal distillate had been refined by treatment with 70 lbs. of 98% sulfuric acid per bbl., neutralized, washed and percolated through clay. It had a specific gravity of 0.879, a flash point of 385° F. and a Saybolt Universal viscosity of 152 secs. at 100° F. It is an oil suitable for use in turbines. It was tested as follows:

25 cc samples of the oil were heated to 200° F. with 5 liters of air per hour bubbling through them. 24 inches of #18 gauge copper wire and 1 gram of iron granules were added to each sample. Also 2 cc. of distilled water were added each day. The samples were examined for acidity, color and sludge after varying periods of time.

TABLE II

*Oils moderately refined by means of sulfuric acid*

|  | Percent conc. | Time, hrs. | N. N. | Lov. color | Sludge, mg./25 cc. |
|---|---|---|---|---|---|
| Oil alone | 0.00 | 72 | 0.14 | 6 | 68 |
|  |  | 240 | 2.5 | 110 | 246 |
|  |  | 336 | 16.0 | 400 | 1,282 |
| 1,3,5 trinitrobenzene and beta-naphthylamine | .05 | 164 | .17 | 12 |  |
|  |  | 356 | 3.9 | 72 | 117 |
| 1,3,5 trinitrobenzene and butyl-alpha-naphthylamine | .05 | 164 | .01 | 2 |  |
|  |  | 356 | .06 | 5 | 11 |
| 1,3,5 trinitrobenzene and phenyl-alpha-naphthylamine | .05 | 164 | .01 | 3 |  |
|  |  | 356 | .02 | 6 | 7 |
| 1,3,5 trinitrobenzene and diethyl-alpha-naphthylamine | .05 | 164 | .01 | 2 |  |
|  |  | 356 | 2.2 | 50 | 30 |
| 2,4,6 trinitrotoluene and beta naphthylamine | .05 | 164 | .4 | 6 |  |
|  |  | 356 | 1.7 | 57 | 87 |
| 2,4,6 trinitrotoluene and phenyl-alpha-naphthylamine | .05 | 164 | 0.0 | 3 |  |
|  |  | 356 | 0.9 | 27 | 8 |
| 2,4,6 trinitro-m-cresol and phenyl-alpha-naphthylamine | .05 | 164 | 1.7 | 32 |  |
|  |  | 356 | 5.2 | 155 | 461 |

All of these products show an appreciable effect in stabilizing this oil.

C. *Oils refined by means of solvents.*—A distillate from a Rodessa crude was refined with furfural, dewaxed and filtered. The finished stock had a specific gravity of 0.856, a flash point of 420° F. and a Saybolt Universal viscosity of 151 sec. at 100° F.

This oil was tested by the same method as used just above for oils moderately refined by means of sulfuric acid. The results were as follows:

TABLE III

*Oils refined by means of solvents*

|  | Percent conc. | Time, hrs. | N. N. | Lov. color | Sludge, mg./25 cc. |
|---|---|---|---|---|---|
| Oil alone | 0.00 | 92 | 0.91 | 9 | 33 |
|  |  | 165 | 20.3 | 320 | 251 |
| 1,3,5 trinitrobenzene and beta-naphthylamine | .05 | 164 | .51 | 6 |  |
|  |  | 356 | 30.0 | 605 | 382 |
| 1,3,5 trinitrobenzene and butyl-alpha-naphthylamine | .05 | 164 | .01 | 1 |  |
|  |  | 356 | .01 | 1 | 39 |
| 1,3,5 trinitrobenzene and phenyl-alpha-naphthylamine | .05 | 164 | .02 | 1 |  |
|  |  | 356 | .01 | 1 | 5 |
| 1,3,5 trinitrobenzene and diethyl alpha-naphthylamine | .05 | 164 | .61 | 7 |  |
| 2,4,6 trinitrotoluene and beta-naphthylamine | .05 | 164 | .21 | 5 |  |
| 2,4,6 trinitrotoluene and phenyl-alpha-naphthylamine | .05 | 164 | .01 | 7 |  |
|  |  | 356 | .01 | 1 | 21 |
| 2,4,6 trinitro-m-cresol and phenyl alpha-naphthylamine | .05 | 164 | .01 | 1 |  |
|  |  | 356 | .01 | 1 | 4 |

All of these products show an appreciable effect in stabilizing oil.

D. A further example of the stabilizing action of these compounds is shown by the following test results. Motor oils, especially those refined by certain solvent extraction methods, tend to oxidize when submitted to high temperatures and to form products that are corrosive to metal bearings. This corrosive action may be quite severe with certain bearings, such as those made of cadmium-silver alloys, and may cause their failure within a comparatively short time. The following test was used to determine the corrosive action of a motor oil on an automobile connecting rod bearing.

The oil used consisted of Pennsylvania neutral and residuum stocks separately refined by means of "chlorex" and blended to give an S. A. E. 20 motor oil with a specific gravity of 0.872, a flash point of 435° F. and a Saybolt Universal viscosity of 318 sec. at 100° F. The oil was tested by adding a section of a bearing, containing a cadmium-silver alloy surface and weighing about 6.0 grams, and heating it to 175° C. for 22 hours while a stream of air was bubbled against the surface of the bearing. The loss in weight of the bearing during this treatment measures the amount of corrosion that has taken place. A sample of the oil containing a stabilizer was run at the same time as a sample of the straight oil. The loss in weight of the section of the bearing in the inhibited sample of oil can thus be compared directly with the loss in weight of the section in the uninhibited oil. The following results were obtained:

TABLE IV

Solvent refined motor oil

| | Percent conc. | Mg. loss in weight | |
|---|---|---|---|
| | | Inhibited | Uninhibited |
| 1,3,5 trinitrobenzene and alpha-naphthylamine | .05 | 41 | 76 |
| 1,3,5 trinitrobenzene and beta-naphthylamine | .05 | 1 | 66 |
| 1,3,5 trinitrobenzene and butyl-alpha-naphthyl amine | .05 | 24 | 76 |
| 1,3,5 trinitrobenzene and phenyl-alpha-naphthyl-amine | .05 | 47 | 76 |
| 1,3,5 trinitrobenzene and diethyl-alpha-naphthyl-amine | .05 | 34 | 66 |
| 2,4,6 trinitrotoluene and beta-naphthylamine | .10 | 0 | 30 |
| 2,4,6 trinitrotoluene and beta-naphthylamine | .05 | 29 | 24 |
| 2,4,6 trinitrotoluene and phenyl-alpha-naphthyl-amine | .10 | 7 | 30 |
| 2,4,6 trinitrotoluene and phenyl-alpha-naphthyl-amine | .05 | 27 | 24 |

These compounds are also effective stabilizers of paraffin wax, as may be seen from the following:

E. A refined paraffin wax of 126° F. melting point was tested by heating to 120° C. for 70 hours with oxygen bubbling through it.

TABLE V

Paraffin wax

| | Percent conc. | N. N. value |
|---|---|---|
| Wax alone | | 35.6 |
| 1, 3, 5 Trinitrobenzene and butyl-alpha-naphthylamine | .05 | 0.0 |
| 2, 4, 6 Trinitrotoluene and phenyl-alpha-naphthylamine | .05 | .00 |
| 2, 4, 6 Trinitro-m-cresol and phenyl-alpha-naphthylamine | .05 | 0.0 |

In general these compounds when used for inhibition will be found to be effective in concentrations of from about .01 to about 0.10 weight percent of the oil to which they are added, and preferably may be used in concentrations of about 0.05 to about 0.10 weight percent. For most of the compounds the solubility in oil will be sufficient to attain such concentrations, or if not, at least great enough to obtain a useful inhibiting effect. When the term "oil-soluble" is used, it indicates a sufficient solubility for the purposes of the invention.

Since the capability of these inhibitors ranges over the field of lubricating oils and waxes, and is not restricted by prior treatment of the lubricating oil, that field is defined herein by the term "high boiling refined petroleum fraction."

We claim:

1. A high boiling petroleum product stabilized against formation of acidic and sludge products of oxidation by the addition thereto of a small amount, sufficient only to inhibit oxidation, of the oil soluble condensation reaction product formed by reacting a tri nitrated member of the group consisting of benzene, toluene, cresol, resorcinal, anisole, with a member of the group consisting of naphthylamine and substituted naphthylamines.

2. A high boiling petroleum product stabilized against formation of acidic and sludge products of oxidation by the addition thereto of a small amount, from about 0.05 to 0.10 weight per cent of the oil soluble condensation reaction product formed by reacting a tri-nitrated member of the group consisting of benzene, toluene, cresol, resorcinol, anisole, with a member of the group consisting of naphthylamine and substituted naphthylamines.

WILLIAM H. JAMES.
EVERETT W. FULLER.